United States Patent [19]

McCleerey

[11] Patent Number: 5,275,573
[45] Date of Patent: Jan. 4, 1994

[54] ELECTRICAL CONNECTOR EJECT MECHANISM

[75] Inventor: Earl W. McCleerey, Mechanicsburg, Pa.

[73] Assignee: The Whitaker Corporation, Wilmington, Del.

[21] Appl. No.: 976,783

[22] Filed: Nov. 16, 1992

[51] Int. Cl.$^5$ .................................. H01R 13/62
[52] U.S. Cl. ........................... 439/159; 439/153
[58] Field of Search ...................... 439/152–160, 439/372, 62, 65

[56] References Cited

U.S. PATENT DOCUMENTS

| | | | |
|---|---|---|---|
| 3,453,586 | 7/1969 | Brendlen, Jr. | 339/45 |
| 4,778,401 | 10/1988 | Boudreau et al. | 439/153 |
| 4,810,200 | 3/1989 | Sakamoto | 439/155 |
| 4,875,873 | 10/1989 | Ishizuka et al. | 439/347 |
| 4,887,188 | 12/1989 | Yoshida et al. | 439/153 |
| 4,952,161 | 8/1990 | Komatsu | 439/155 |
| 4,975,805 | 12/1990 | Schmutzler | 439/160 |
| 5,011,420 | 4/1991 | Sakamoto | 439/152 |
| 5,026,296 | 6/1991 | Hashiguchi | 439/159 |
| 5,026,296 | 6/1991 | Hashiguchi | 439/159 |
| 5,033,972 | 7/1991 | Komatsu et al. | 439/153 |
| 5,065,004 | 11/1991 | Mizuno et al. | 439/153 |
| 5,115,376 | 5/1982 | Nakajima | 439/157 |
| 5,147,211 | 9/1992 | Tondreault et al. | 439/152 |

FOREIGN PATENT DOCUMENTS

| | | |
|---|---|---|
| 2-24481 | 2/1990 | Japan . |
| 2-52280 | 4/1990 | Japan . |
| 3-39266 | 4/1991 | Japan . |
| 3-79177 | 8/1991 | Japan . |

*Primary Examiner*—David L. Pirlot
*Attorney, Agent, or Firm*—David L. Smith

[57] ABSTRACT

A ejector (12) for a memory card connector (10) having a host pin connector (18) adapted to receive a corresponding electrical connection terminal of a memory card (42) comprises a cover (54) disposed to receive a input force for controlled movement along memory card tracks (30) affixed to the host pin connector (18), the cover (54) having a cam engaging element (74). A cam lever (84) is pivotally mounted to said connector housing (14) includes a cam engaging surface (72) to receive the cam engaging element (84) and an ejector engaging element (106) disposed to linearly and rotationally engage the rear surface (126) of the memory card (42); whereby movement of the cover (54) actuates the cam lever (54) to cause said ejector engaging element (106) of the cam lever (68) to linearly and rotationally engage the electric terminal surface of the memory card (42) in a manner to disengage the memory card (42) from the host pin connector(s) (18).

17 Claims, 11 Drawing Sheets

ELECTRICAL CONNECTOR EJECT MECHANISM

BACKGROUND OF THE INVENTION

1. Field Of The Invention

The present invention relates to an electrical connector useful for signal transmission and reception between a memory card and the circuit of a machine concerned, and more particularly to a mechanism to effect ejection of the memory card from a header providing electrical connection to the circuit through use of a cam lever engaging a cam surface which force multiples the hand force without causing accelerated memory card action to throw the card out.

2. Description of Prior Art

In the electrical connector industry, it is well known to provide an electrical connector useful for signal transmission and reception between a memory card and the circuit of a machine concerned. The Personal Computer Memory Card International Association ("PCMCIA") has established memory card (or "PC Card") standards defining the PC Card's physical outline standards, connector system and qualification test parameters, including reliability, durability and environmental test parameter, PC Card Standard, Release 2.0, PCMCIA (September 1991), which is hereby incorporated by reference.

In more detail, an electrical connector includes a pin header to act as pin shrouds protecting an array of pin terminals which receive the memory card and engage the circuit as well as provide polarization for the memory card. The electrical connectors are held in the pin header by frictional engagement between the female contacts carried by the memory card (or IC pack or PC card), and the male pins carried by the pin header. A tight fit is necessary for ensuring proper frictional engagement of the pin header and the contacts of the memory card. Because the pin headers are relatively easily damaged, it becomes necessary to maintain a proper alignment of the memory card (or PC card) when engaging or disengaging with the pin contacts.

To disengage the memory card from the pin header, the sum of the frictional engagement forces of all of the numerous contacts require that a substantial friction force must be overcome during the un-mating operation. In such instances, it is often desirable to have an ejection means to help eject the connector from the pin header. Thus, there has been a need for an ejection device wherein a sufficient force is applied to disengage the memory card from the pin header, while at the same time maintaining linear alignment of the memory card to prevent damage to the pin header contacts as well as protect the card from being ejected and completely out onto the floor. Many prior attempts to satisfy this need have been suggested in the prior art.

Typical of such prior attempts is U.S. Pat. No. 4,178,051 issued to Kocher et al. which describes a latch/eject pin header (10) which provides for positive locking of the connection of a header and positive ejection of the connector upon disconnect. The header includes an elongated housing defining a elongated cavity (14) therein with a plurality of pin terminals (20) fixed in the base of the cavity. Latching members (28) pivotly mounted at the ends of the cavity include a latching arm for engaging the mating connector, an eject arm (36) for levering the connector from the cavity, and an actuating arm (38) to effect pivotal movement of the latching member (28).

In the embodiment shown in FIG. 4 of Kocher et al., a two piece actuation member includes an actuating member (58) having a pin mounted thereon engaging a recess (56) of a latching arm (50) and a cam surface (62) on the free end thereon. Inward movement of the actuation member (58) causes the cam surface (62) to engage an end portion of the mating face (44) of the connector to cam it out of the mating engagement with the terminal pins (20) of the header (10).

Another example of such an ejection device is described in U.S. Pat. No. 4,875,873 issued to Ishizuka et al. In Ishizuka, a multi-terminal connector composed of a male housing (9) and a female housing (1) is disclosed wherein each housing member (1,9) is provided with a plurality of female and male terminals respectively. The housing members can be connected or disconnected from each other by a relatively strong force owing to a cam mechanism integrated therein. The cam mechanism (as illustrated in FIGS. 2,3,4) includes guide rails (4,4') on the female housing (i) to define slots (5), and cam tracks (13,13') formed on the male housing (9). A pair of sliders (15) has grooves defined to engage the guide rails (4,4'), a cam follower (19) which extends through the slots (5,5') to engage the cam tracks, and a pin (20) which is engagable pin guide grooves formed in a rotary actuator plate (21). As shown in FIGS. 2–4, a handle (24) of the rotary guide plate (21) is rotated about axis (22), which fits within axis (7) of the female housing (1), and the pin (20) follows the contour of pin guide grooves (23,23') to move cam follower (19) along the slots (5) and along cam tracks (13,13'). This motion of the handle (24) causes the connection and disconnection of the female and male housings (1,9) which guide shafts (8) formed on the female housing (1) engage corresponding female portions (14) of the male housing to ensure proper alignment therebetween.

While such devices provide the important advantages of proper alignment and the use of leverage to increase applied force in an ejection technique, they do not provide the advantage of multiplying the applied hand force to maximize mechanical leverage through the utilization of cam surfaces which induce the coordination of both linear and rotational forces to eject the connector from the pin header, wherein the ejector is a self contained integrated unit requiring no specialized surfaces on the substrate or memory card being ejected.

SUMMARY OF THE INVENTION

It is an object to provide a memory card connector having an ejector with an actuating element disposed for controlled movement so as to provide for linear and rotational engagement of the memory card in a manner which causes the ejected memory card to "smoothly release from" the memory card connector.

It is a further object to provide a memory card ejector which utilizes cam surfaces to induce the coordination of both linear and rotational forces to eject the memory card from the pin header (or memory card connector) within a limited space.

It is a still further object of the present invention is to provide a memory card ejector which multiplies the applied hand force to maximize mechanical leverage to eject the memory card from its memory card connector.

A still further object is to provide a memory card ejector having a cam lever defining a cam engaging surface disposed to impart a proportionally greater displacement of the ejector engaging element of the arm portion of the cam lever upon the memory card than that covered by the initial movement of the cam engaging element on the cam surface.

A still further object is to provide a memory card ejector having a self contained integrated unit requiring no specialized surfaces on the substrate or memory card disposed to be ejected.

A still further object is to provide a method of connecting/ejecting a memory card from a memory card connector which meets all of the above objects and provides the above described advantages.

According to the invention, a memory card ejector for a memory card connector having a host pin connector adapted to receive a corresponding electrical connection terminal of a memory card comprises an actuating element disposed for controlled movement on a guide element positioned on the memory card connector. A cam mechanism mounted on the memory card connector includes a cam lever defining a cam surface displaceable by the actuating element disposed to actuate the cam lever, which has an ejector engaging element disposed to linearly and rotationally engage one surface of the memory card; whereby movement of the actuating element actuates the cam mechanism thereby causing the ejector engaging element of the arm portion of the cam lever to linearly and rotationally engage the surface of the memory card in a manner to disengage the memory card from the host pin connector.

Preferably, an ejector for a memory card connector having a host pin connector adapted to receive a corresponding electrical connection terminal of a memory card comprises a cover positioned on the memory card connector disposed to receive a input force for controlled movement along memory card tracks affixed to the memory card connector, the cover having a cam engaging element. A pivotally mounted cam lever on the memory card connector includes a cam engaging surface to receive the cam engaging element, and defines an ejector engaging element disposed to linearly and rotationally engage the electrical terminal surface of the memory card; whereby movement of the cover actuates the cam lever to cause the ejector engaging element of the cam lever to linearly and rotationally engage the electric terminal surface of the memory card in a manner to disengage the memory card from the host pin connector.

In another embodiment, an electrical connector having one housing retaining a host male pin connector and the other housing retaining a corresponding female electrical connection terminal comprises an actuating element disposed for controlled movement along one of said elements. A cam mechanism mounted on the electrical connector defining a cam surface displaceable by the actuating element is disposed to actuate an arm portion of a cam lever having an ejector engaging element disposed to linearly and rotationally engage either of said housings; whereby movement of the actuating element actuates the cam mechanism to cause the ejector engaging element of the arm portion of a cam lever to linearly and rotationally engage one of the housings in a manner to either connect or disconnect said host male pin connector and corresponding female electrical connection terminal of said housings.

In another embodiment, a memory card connector comprises a host pin connector adapted to receive a corresponding electrical connection terminal of a memory card, an actuating element disposed for controlled movement on a guide element positioned on the memory card connector; and a cam mechanism mounted on the memory card connector defines a cam surface displaceable by the actuating element disposed to actuate a arm portion of a cam lever having an ejector engaging element disposed to linearly and rotationally engage one surface of the memory card; whereby movement of the actuating element actuates the cam mechanism thereby causing the ejector engaging element to linearly and rotationally engage the surface of the memory card in a manner to disengage the memory card from the host pin connector.

Further, the invention includes a method for connecting/ejecting a memory card from a memory card connector comprises providing a memory card having electrical connection terminals; providing a memory card connector having a host pin connector adapted to receive the electrical connection terminals in a memory card; providing an engaging/disengaging apparatus mounted on said memory card connector which includes: an actuating element disposed for controlled movement on a guide element positioned on said memory card connector; and a cam mechanism defining a cam surface displaceable by the actuating element disposed to actuate an arm portion of a cam lever having an ejector engaging element disposed to linearly and rotationally engage one of the memory card surfaces; positioning the memory card within the memory card connector in a manner where the ejector engaging element of the arm portion is positioned to engage one of the memory card surfaces; moving the actuating element to actuate the cam mechanism to displace the cam lever in a manner to impart a linear and a rotational force on the ejector engaging element of the arm portion engaging the memory card engaging surfaces thereby either connecting/ejecting the memory card from the memory card connector.

As pointed out in greater detail below this invention provides important advantages. The present invention and its various embodiments, as described above, provides an memory card ejector utilizing rotary and linear ejector force which causes the memory card to "smoothly release from" the memory card connector. Further, the present invention multiples the transmitted force applied by the movement of the actuating means (or cover) to a cam mechanism having ejector engaging elements which in turn eject the memory card from its connector. Still further, the present invention includes a cam mechanism which defines an ejector where a cam surface is disposed to impart a maximum displacement of the ejector engaging elements of the arm portion of the cam lever during the initial movement of the actuating means (or cover). All of these elements, separately and in combination, provide a rotary and linear ejection force which disconnects the memory card from the connector in manner so that, as described above, the memory card appears to "jump" out of the memory card connector upon movement of the actuating element (or cover).

The invention itself, together with further objects and attendant advantages, will best be understood by reference to the following detailed description taken in conjunction with the accompanying drawings.

DETAILED DESCRIPTION OF THE INVENTION

Figure 1:
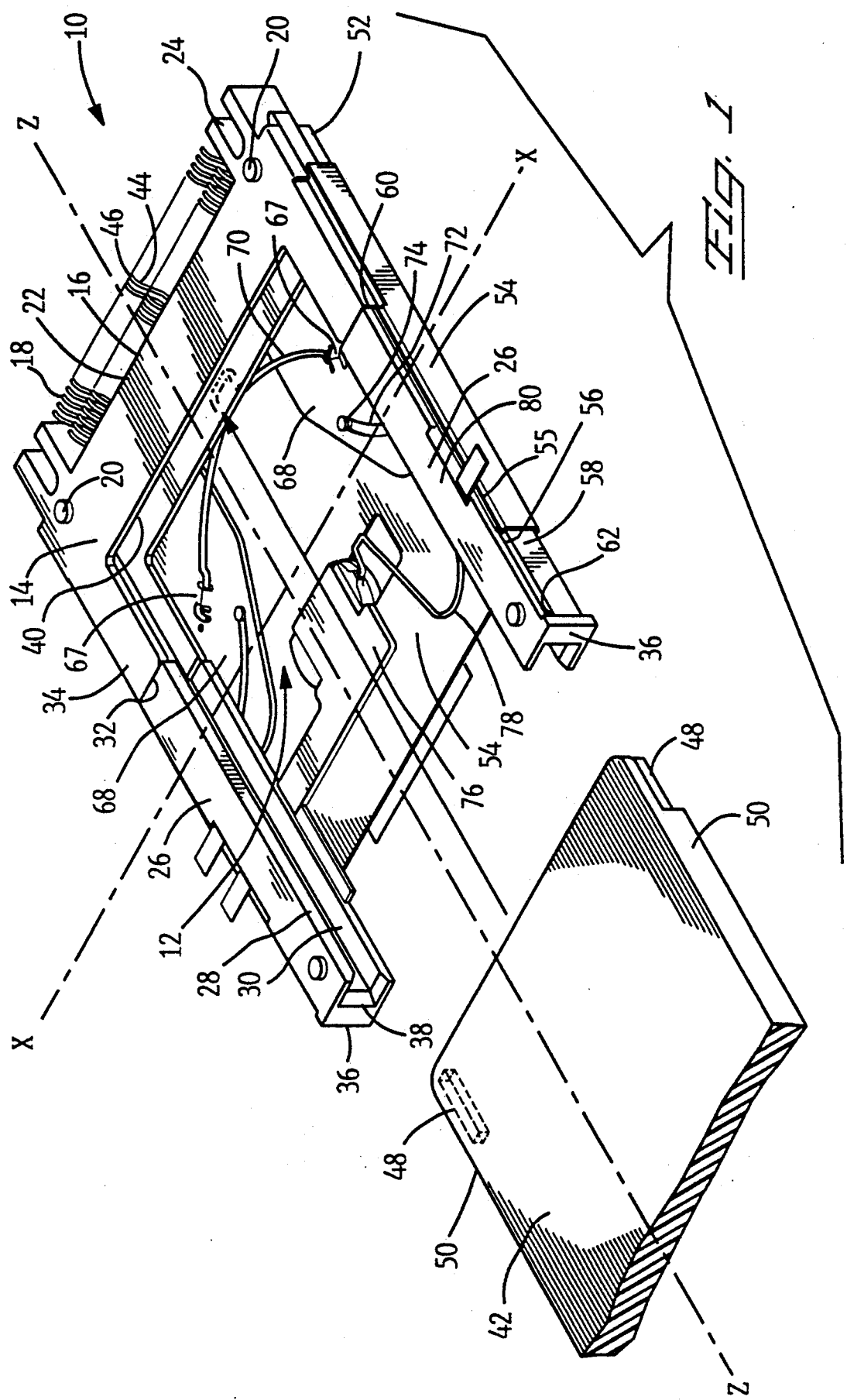
FIG. 1 is a bottom perspective view of the memory card connector with card tracks and a memory card ejector receiving a memory card.

Turning now to the drawings, FIG. 1 illustrates a perspective bottom view of an assembled memory card connector 10 and memory card ejector 12 disposed in a received position so as to receive a memory card 42. The memory card connector 10 comprises a connector housing 14 which houses electrical contacts, such as host pin connectors 18, which host pin connectors 18 extend from the rear surface 16 of the connector housing 14. The connector housing 14 further comprises polarization keys 20 on the bottom surface 22 of the connector housing 14 which act to align the memory card connector 10 during mounting to a printed circuit board (not shown). Longitudinal slots 24 extend rearwardly from the rear surface 16 of the memory card connector 10 which act to receive memory card connector securing means (not shown) to secure the memory card connector 10 to a printed circuit board (not shown). On the top surface 52 of the connector housing 14, are further frontward extensions (not shown) of these longitudinal slots 24 which act to allow movement of an arm portion (not shown) of a cam lever 68. Extending frontwardly from the connector housing 14 (which is in the shape of an "H" and alternately referred to as an "H-connector assembly") are memory card track legs 26 which include on their inside surface 28 a memory card track 30. The memory card track legs 26 are attached to the connector housing 14 by securing means (such as tongue and groove interconnections, not shown) at the front surface 32 of an arm 34 which extends frontwardly from the connector housing 14. At the frontward edge 36 of the memory card track leg 26 is a track mouth 38 of the memory card track 30.

As assembled in FIG. 1, the memory card track 30 extends continuously from the track mouth 38 to the front surface 40 of the connector housing 14. Memory card keys 48 are positioned on the side surface 50 of the memory card 42 (or housing) to ensure proper polarization of the memory card 42 when inserted into the memory card connector 10.

Extending frontwardly from the front surface 40 of the connector housing 14 are post ends (not shown) of host pin connectors 18 which are disposed to receive corresponding electrical terminals (not shown) of the memory card 42. The tail ends 44 of the host pin connectors 18 extend rearwardly and downwardly from the rear surface 16 of the connector housing 14 to a free end 46 which is disposed to be connected to conductor pads on a printed circuit board (not shown). U.S. Patent Application No. 07/926,628, entitled "Electrical Connector" by Robert S. Correl, Jr., Jon A. Fortuna, and Ronald W. Brennian, Jr., (assigned to AMP, Incorporated, Harrisburg, Pa., the present assignee of this invention) filed on Aug. 10, 1992, describes in detail the above arrangement of the host pin connectors, and is incorporated by reference herein. Thus, when memory card 42 is connected to the memory card connector 10 by insertion of the memory card 42 into the track mouth 38 of the memory card track 30, an electrical connection is established between the memory card 42 and the printed circuit board (not shown).

Contacted to the top surface 52 of the memory card connector 10 is an actuating element, such as a sliding cover or "cover," 54. Cover 54 is slidably attached at cover guide 55 in a cover guide groove 56 on the outside surface 58 of the memory card track leg 26. The cover guide groove 56 extends continuously from its rear edge 60 to a cover guide groove stop 62 at the frontward end 36 of the memory card track legs 26, the cover 54 being slidably displaceable along the length of the cover guide groove 56.

Attached to the bottom surface 66 of the cover 54 are cam mechanisms 65 having a cam follower or "cam levers" 68. The cam levers, or cam followers, 68 are attached at a pivot point (not shown) fixed onto the memory card connector 10 and include a cam surface 72, such as an arcuate groove 72, in which is disposed a cam engaging element 74 which extends from the bottom surface 66 of the cover 54.

Biased between the cam levers 68 is a spring 70 connected to the cam levers 68 at spring connecting points 67, which biases the cam levers away from the center longitudinal axis z—z of the memory card connector 10. This assures that upon ejection of the memory card the cam levers 68 are returned to a memory card 42 receiving position.

Also connected to the bottom surface 66 of the cover 54 is a t-knob 76 against which is biased a t-knob spring 78. The t-knob spring 78 is fixed in a position on the cover 54 at a t-knob spring securing post (not shown) so as to bias the t-knob 76 away from one memory card track leg 26 and towards a switch (not shown) positioned in an indent 80 on the opposite memory card track arm 26.

Figure 4:
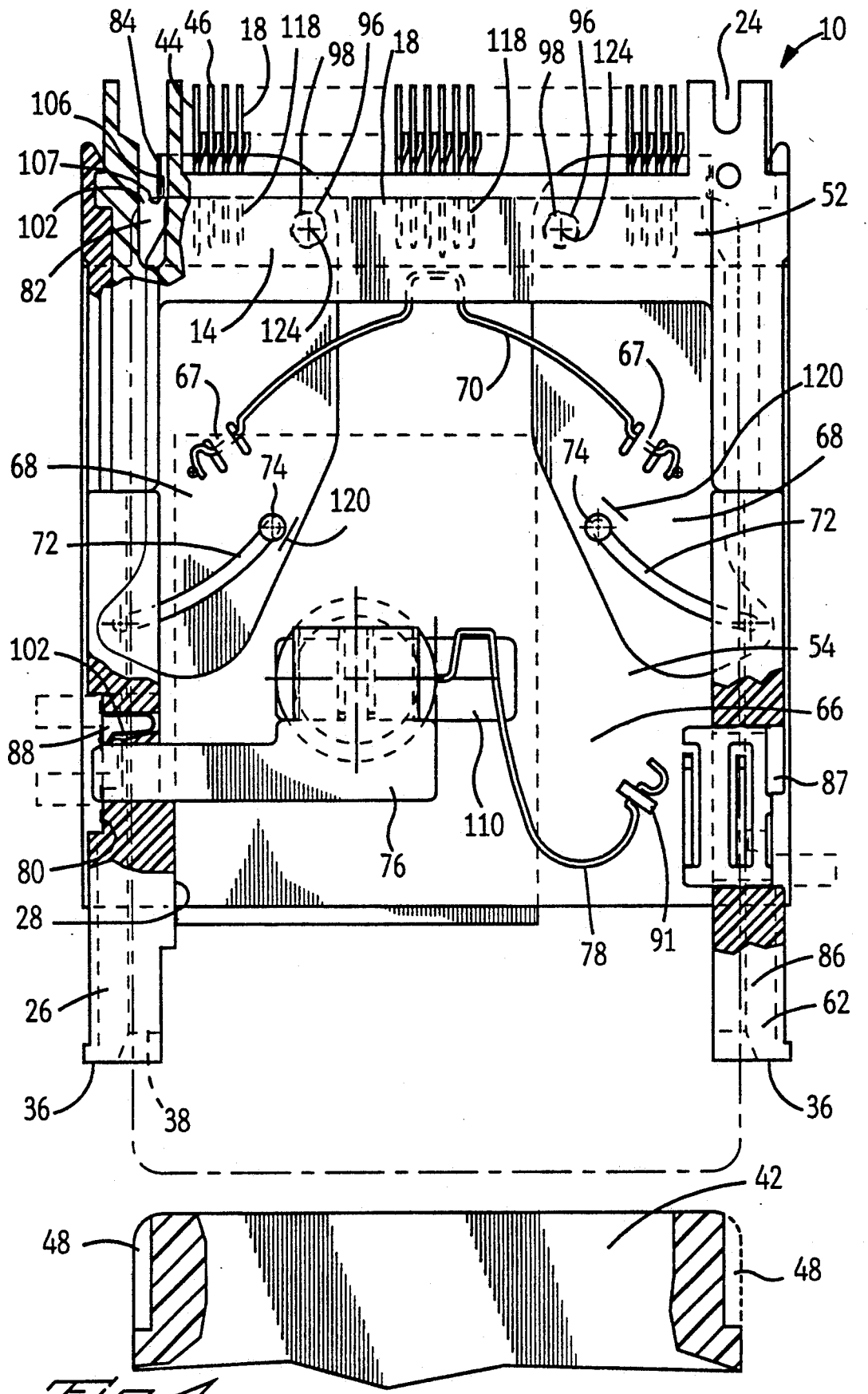
FIG. 4 is a bottom view of the memory card connector of FIG. 1 having a memory card positioned to be inserted to the memory card connector and the inserted memory card shown in phantom lines with partial cross section views of the memory card connector and the memory card ejector, and illustrating the T-knob of the cover in a latched position.

As assembled in FIG. 1 and 4, the cover 54 is fixed into place by the t knob 76 being biased into the switch in an open position (not shown). By sliding the t-knob against the direction of the biasing force of the t-knob spring 78, the cover 54 can be moved toward the frontward direction, e.g., toward the cover guide groove stop 62. Because the cam lever 68 is fixed to a pivot point (not shown) on the top surface of the memory card connector, the cover 54 when moved is displaced relative to the pivot point (not shown) of the cam lever 68. As a result, the movement of the cover 54 in the frontward direction moves the cam engaging element 74 on the bottom surface 66 of the cover 54 along the arcuate groove 72 of the cam lever 68, pivoting the cam lever 68 around the pivot point 124.

Figure 2:
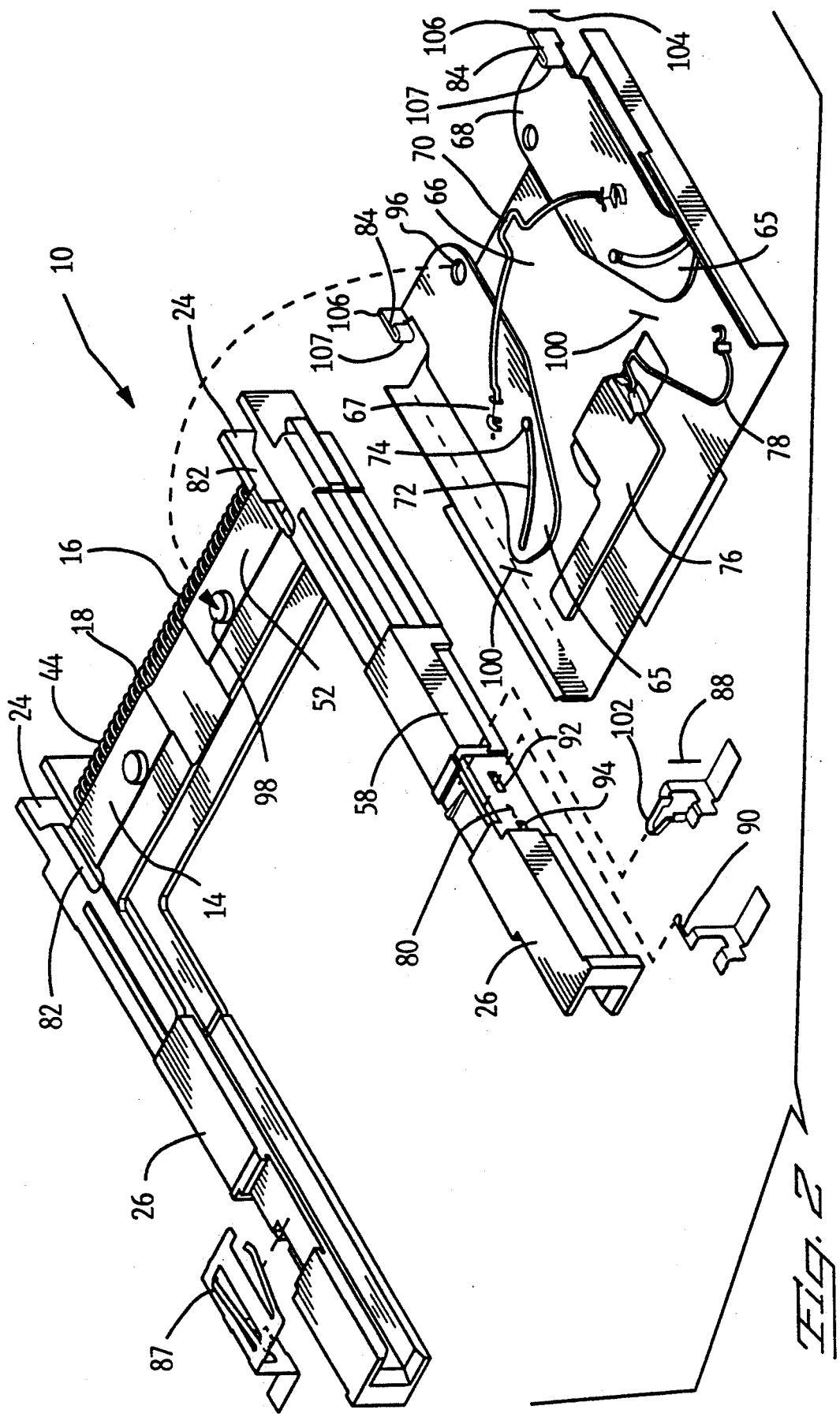
FIG. 2 is a top perspective view of the memory card connector with card tracks exploded from a bottom perspective of the memory card ejector illustrating the positioning of cam/lever pivot along dotted line P-P.

Turning now to FIG. 2, an exploded view of the memory card connector of FIG. 1 is shown, illustrating the top surface 52 of the memory card connector 10. In FIG. 2, the connector housing 14 is shown with the tail ends 44 of the host pin connectors 18 extending rearwardly and downwardly from the rear surface 16 of the connector housing 14. Extending frontwardly from the rear surface 16 of the connector housing 14 are longitudinal slots 24 which are disposed to receive securing means (not shown) to secure the memory card connector 10 to a printed circuit board (not shown) and further frontwardly extending slots 82 which act to receive an engaging surface 84 on each of the two cam levers 68 (discussed further below).

Attached to one of the track legs 26, is a transient suppression protector 87 which acts to protect connector module from transient suppression interference by grounding the slidable cover 54 to the printed circuit board (not shown). Transient suppression protection is discussed in U.S. Pat. No. 4,726,638, which discussion is herein incorporated by reference. Attached to the other track leg 26, is a switch 88 including a spring 102 and switch spring stop 90 which are disposed to be secured into the memory card track leg 26 by insertion into corresponding apertures 92,94 in the outside surface 58 of the memory card track leg 26.

Shown in inverted position is the cover 54 with cam mechanism 65 comprising cam levers 68 attached to the bottom surface 66 of the sliding cover 54. The cam levers 68 include a pivot hole 96 which is disposed to fit a pivot knob 98 on the top surface 52 of the memory card connector housing 14. Spring 70 is disposed between the two cam levers 68 and acts to bias the frontward end 100 of the cam levers 68 away from the longitudinal center axis of the sliding cover 54 at spring connecting points 67 on the cam levers 68. Arcuate grooves 72 are positioned towards the frontward end 100 of the cam levers 68 in which are cam engaging elements 74 which extend from the bottom surface 66 of the cover 54. Arm portion 84 of cam lever 68 is positioned on the rearward end 104 of the cam lever 68 and includes an ejector engaging element 106 which is disposed to engage a memory card (not shown) when a memory card 42 is inserted into a memory card connector 10 (as shown in FIG. 1).

When assembled together, in the manner illustrated by dotted line P—P of FIG. 2, the cover 54 with cam mechanism 65 positions the cover guide 55 into the cover guide groove 56 and the out side of the memory card track legs 26 and pivot holes 96 of the cam levers 68 on the pivot knobs 98. Similarly, the ejector engaging element 106 fits into the frontwardly extending slots 82 of the connector housing 14 and is positioned adjacent to the engaging surface 132 positioned on the rear surface 126 of the memory card 42.

Figure 3:
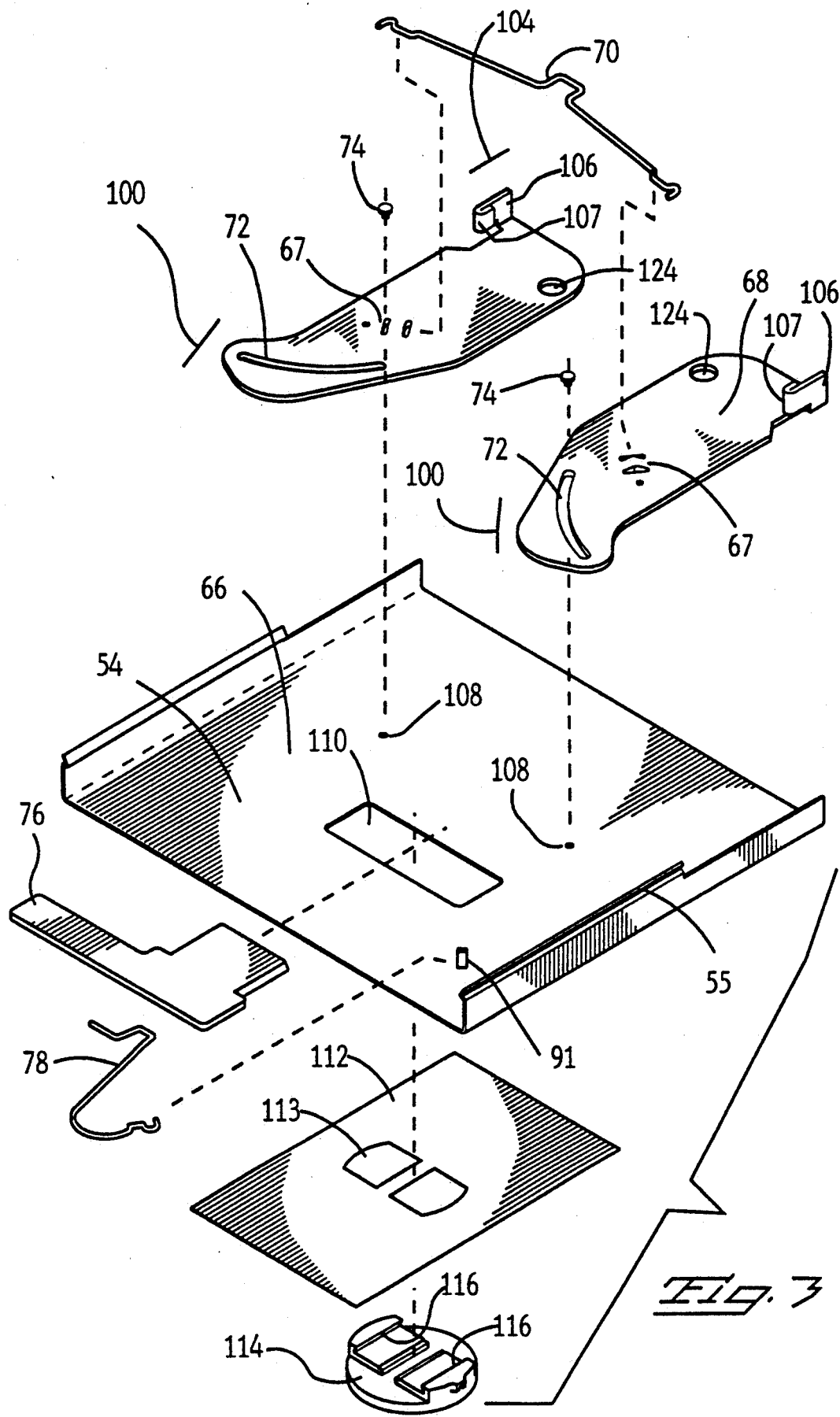
FIG. 3 is a partial exploded view of the memory card ejector of FIG. 1 illustrating elements of the memory card ejector.

FIG. 3 is an inverted partial exploded view of a memory ejector as shown in FIG. 2, illustrating the bottom surface 66 of the sliding cover 54. Cam levers 68 are shown with arcuate grooves 72 and cam engaging element 74. On the rearward end 104 of the cam lever 68 is an arm portion 84 extending from the pivot point 124 and defining an ejector engaging element 106 having an engaging surface 107. The engaging surface 107 defines a smooth surface which is intended to engage a memory card 42 in a fully assembled memory card connector 10, as shown in FIG. 1. Pivot holes 96 are shown which are disposed to receive a pivot knob (not shown) positioned on the top surface 52 of the memory card connector 10. A spring 70 is disposed to fit into spring connector points 67 on the cam levers 68.

In FIG. 3, the bottom surface 66 of the cover 54 is shown including holes 108 adapted to receive cam engaging element 74. Also disposed on the bottom surface 66 of the sliding cover 54 is t-knob spring stop 91. Positioned on the outer edges of the cover 54 is the cover guide 55 which is adapted to fit into a groove (not shown) on the outside edge of the memory card connector (not shown). Aperture 110 is adapted to receive the t-knob 76. A sheath 112 is disposed to contact the top surface of the sliding cover 54 and includes two holes 113. A handle 114 is disposed to fit into the two holes 113 and is secured to the t-knob 76 via securing means, a clip assembly, 116.

FIG. 4 illustrates a bottom view of the memory card connector 10 and memory card ejector 12 in partial cross section wherein no memory card 42 has been inserted. As best shown in FIG. 4, connector housing 14 retains host pin connectors 18 comprising tail ends 44 and post ends 118 adapted to be received by electrical connection terminals (not shown) in a memory card 42. In the unloaded (or fully loaded) position illustrated in FIG. 4, the t-knob 76 is biased by t-knob spring 78 into the indent 80 to engage switch 88 to prevent movement of the sliding cover 54. Spring 70 is biased between cam levers 68 at spring connector points 67 to secure the cam levers 68 in position with the cam engaging element 74 positioned at the rearward end 120 of the arcuate groove 72.

The cam levers 68 are connected to the connector housing 14 at a pivot point 124, where the pivot hole 96 of the cam levers 68 is received by the pivot-knob 98 on the top surface 52 of the memory card connector 10. As shown in FIG. 4, the arm portion 84 is positioned in the frontwardly extending slot 82 at a point behind the line of the rear surface 16 of the connector housing 14.

Figure 5:
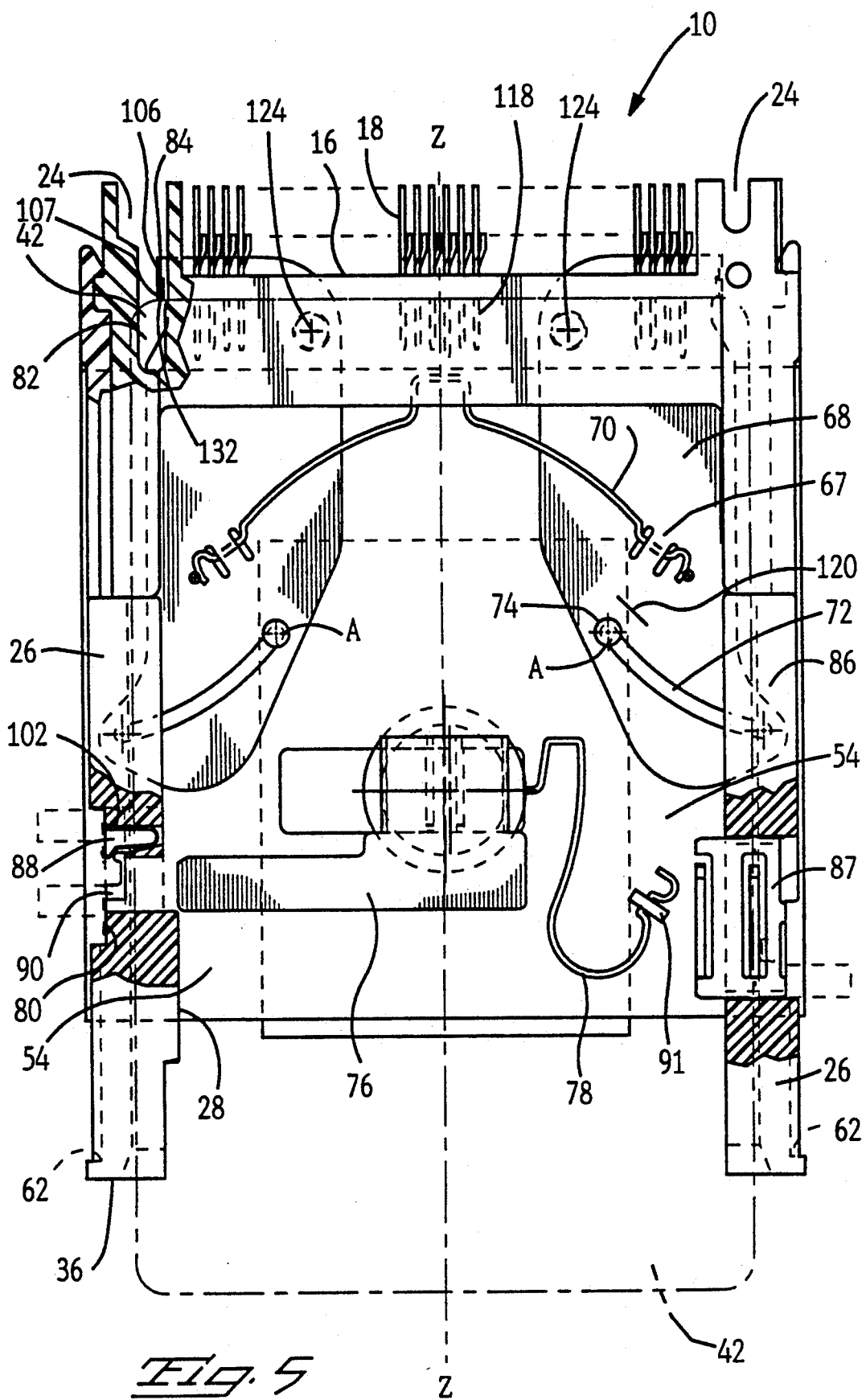
FIG. 5 is a bottom view of the memory card connector of FIG. 1 having a memory card shown in phantom lines with partial cross section views of the memory card connector and the memory card ejector in a non-eject position and illustrating the T-knob of the cover in a unlatched position.

FIG. 5 illustrates the memory card connector 10 of FIG. 4 wherein a memory card 42 is inserted therein. The t-knob 76 is slid along the lateral axis of the memory card connector and against the t-knob spring 78 and away from the switch 88, thereby closing the switch 88 with the spring 102 coming to rest against the spring stop 90, allowing the sliding cover 54 to freely slide along the longitudinal axis z—z of the memory card connector 10. As described above, the ejector engaging elements 106 of the arm portions 84 are engaged with the engaging surface 132 of the memory card 42 inserted into the memory card connector 10.

Figure 6:
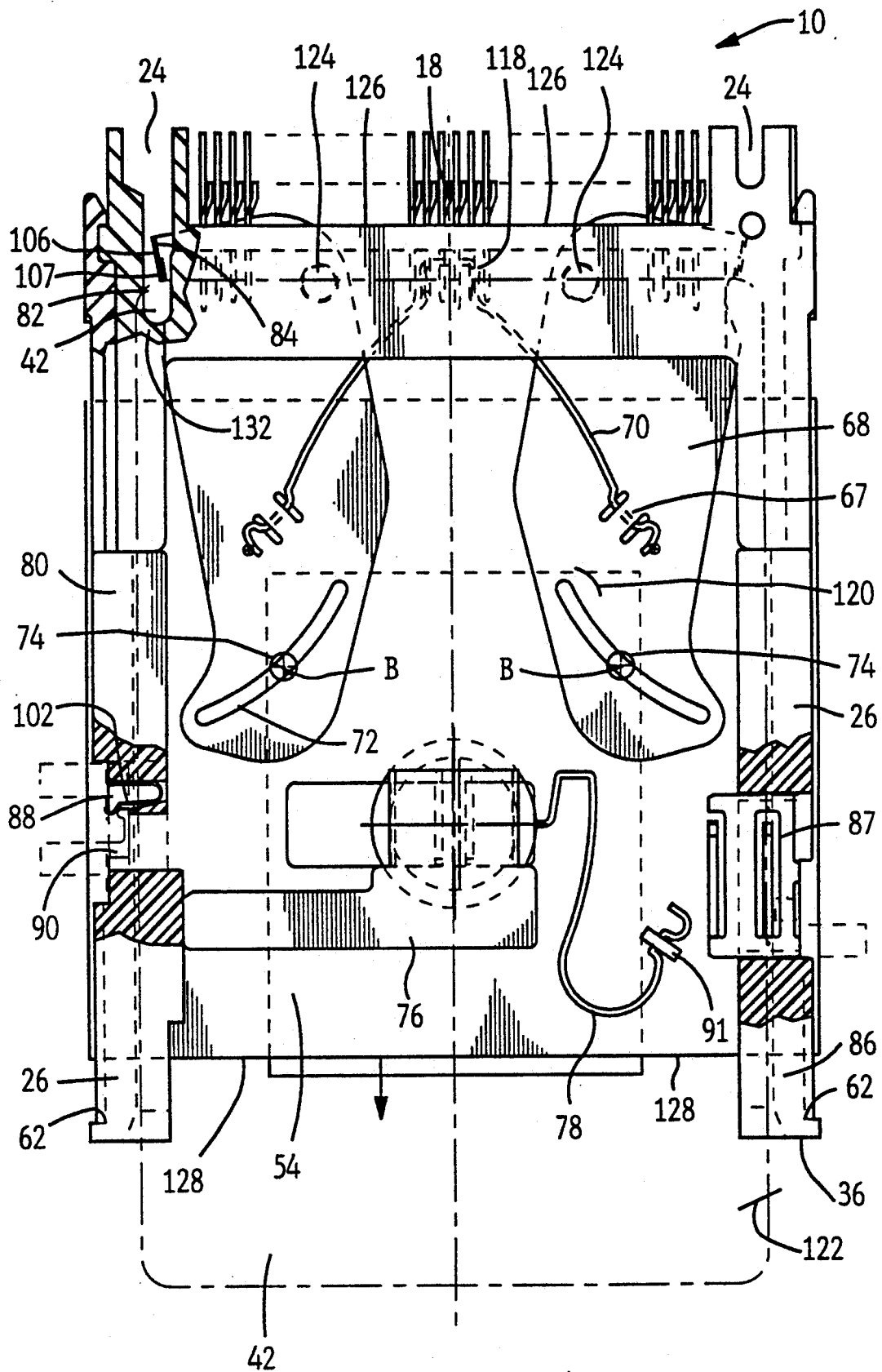
FIG. 6 is a bottom view of the memory card connector of FIG. 1 having a memory card shown in phantom lines with partial cross section views of the memory card connector and the memory card ejector in an initial eject position and illustrating the T-knob of the cover in a unlatched position.

FIG. 6 illustrates the memory card connector 10 of FIG. 4 wherein a memory card 42 has been inserted. The t-knob 76 is slid away from the switch 88 and against the t-knob spring 78, and the cover 54 is moved toward the rearward end 122 of the memory card connector 10. The movement of the cover 54 in turn displaces the cam levers 68 against the biasing force of the spring 70 as a result of the relative movement of the cam engaging element 74 within the arcuate groove 72 of the cam levers 68, thus pivoting the cam levers 68 around their pivot points 124. The ejector engaging elements 106 of the arm portions 84 are linearly and rotationally displaced within the frontwardly extending slots 82. The displacement of the cam levers 68 around the pivot points 124 likewise causes the arm portions 84 to linearly and rotationally engage the engaging surface 132 on the rear surface 126 of the memory card 42, and as shown in FIG. 6, begin to disengage and eject the memory card 42 from the post ends 118 of the host pin connectors 18 in a rearward direction.

Figure 7:
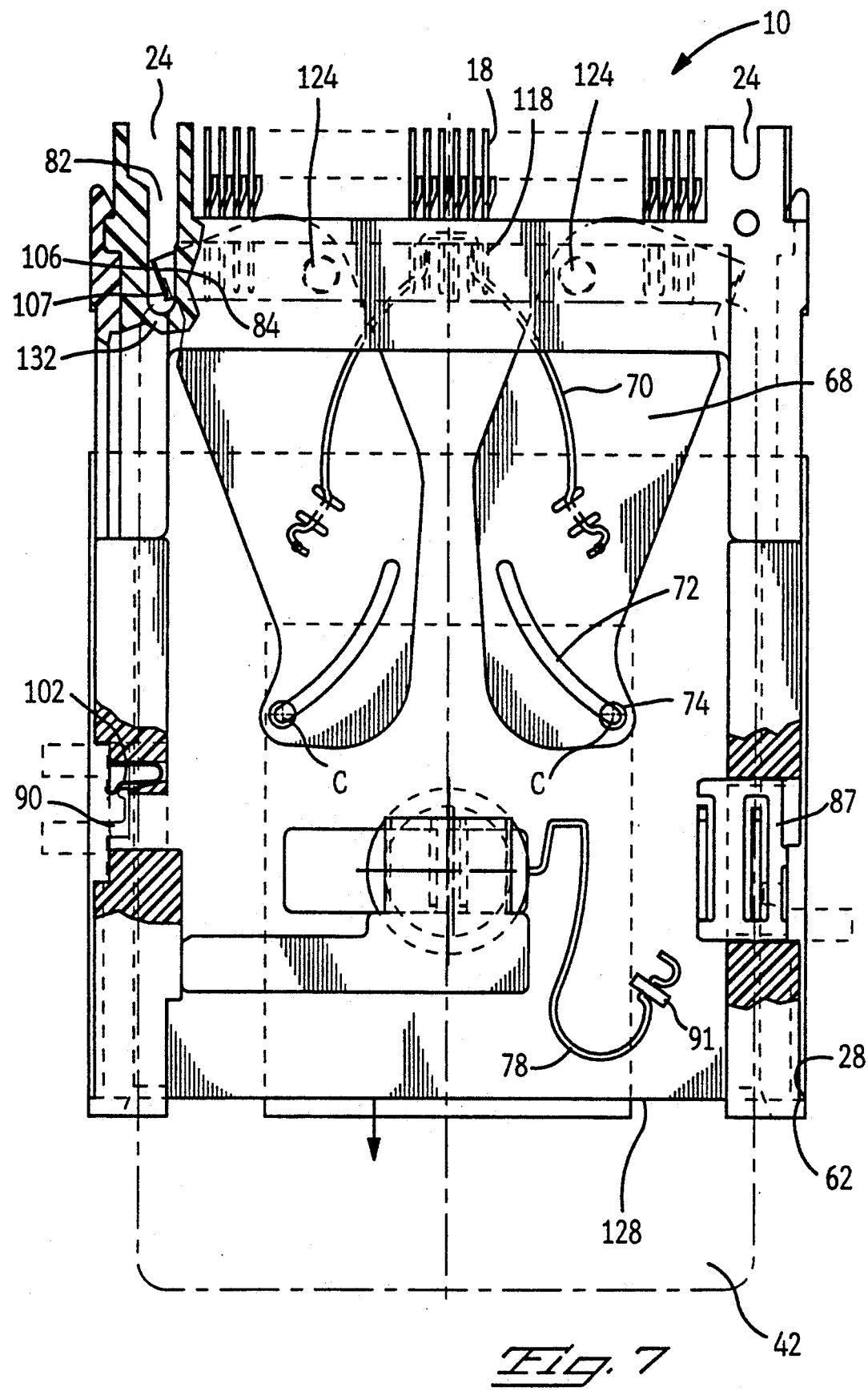
FIG. 7 is a bottom view of the memory card connector of FIG. 1 having a memory card shown in phantom lines with partial cross section views of the memory card connector and the memory card ejector in an full eject position and illustrating the T-knob of the cover in a unlatched position.

FIG. 7 illustrates the memory card connector 10 of FIG. 4 wherein the memory card 42 is fully disengaged and ejected from the post ends 118 of the host pin connectors 18. As shown in FIG. 7, the forward end 128 of the cover 54 is moved so that the cover guide (not shown) reaches the cover guide groove stop 62. In FIG. 7 the cam engaging elements 74 are fully displaced within their respective arcuate groove 72, and the cam levers 68 are displaced further against the biasing force of the spring 70. In this position, the arm portions 84 are fully linearly and rotationally displaced in their respective forwardly extending slots 82 with their engaging surfaces 106 engaging the memory card 42 at the memory card engaging surface 132, thus disengaging the memory card 42 from the host pin connectors 18.

As shown in FIGS. 5-7, the linear movement of the cover 54 along the cover groove 60 to the cover guide groove stop 62 will move the cam engaging element 74 relative to the arcuate grooves 72 of the cam levers 68 the full distance of the arcuate grooves 72 which displaces the cam levers 68 around the pivot point 124. The movement of the arm portion 84 of cam lever 68 and its ejector engaging element 106 is both rotational and linear. The rotational movement of the ejector element 106 coupled with its linear displacement along the longitudinal axis of the memory card connector 10 is maximized by the arrangement of the cam mechanism 65. As a result of the configuration of the cam lever 68, which takes into consideration the respective distances from the cam engaging element 74 and the arm portion 84 to the pivot point 124, a leveraging effect is established such that a lesser force applied to the cover 54 results in a substantial force in the forward direction of the arm portion 84.

Also, as illustrated in FIGS. 5-7, the initial respective movement of the cam levers 68 is greater than the respective proportional movement of the cover 54 from points A-B of FIGS. 5-6, respectively. This occurs in part as a result shape and orientation of the arcuate groove 72 and the arrangement of the cam mechanism 65 having the arm portion 84 almost parallel to the rear surface 126 of the memory card 42 and placed so that its arc sweeps through its maximum radial arc imparting longitudinal force to the memory card. i.e., the pivot point 126 of the cam levers 68 is positioned near or along an axis defined by rear surface of the memory card 42. The movement of the cover 54 from points B-C of FIGS. 6-7 continues to result in a relative linear and rotary displacement of the arm portion 84, and thus the continued force bears against the memory card 42 to completely disengage it from the host pin connectors 18 during the full movement of the sliding cover 54, i.e., points A-B-C, as described above.

After the memory card 42 is disengaged from the host pin connectors 18, the biasing action of the spring 70 forces the cam levers 68 back to their original positions, thus drawing the sliding cover 54 back toward the rearward edge 60 of the cover guide groove 56. When the sliding cover 54 returns to its resting position, the t-knob 76 reenters the switch 88 to lock the sliding cover 54 into place.

Figure 8:
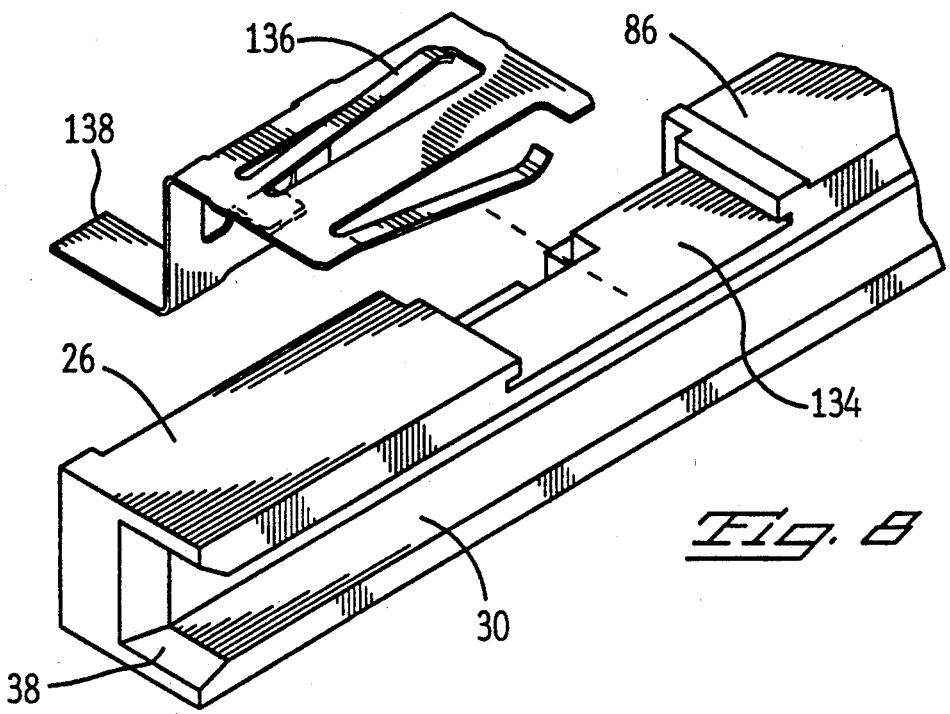
FIG. 8 is an exploded perspective view of a memory card track leg including a transient suppression protection spring.

Turning to FIGS. 8-11, various aspects of the preferred embodiment of the present invention are shown. In FIG. 8, the forward terminal part of a memory card track leg 26,86 including a transient suppression protector 87 is illustrated. The track leg 26,86 includes a memory card track 30 and a track mouth 38 wherein a memory card (not shown) can be inserted. The memory card track leg 26, shown in FIG. 8 is disposed to receive the transient suppression protector 87 within a notch 134. The transient suppression protector 87 is designed to contact the sliding cover (not shown) at a cover contact point 136 and the printed circuit board at a PCB contact point 138, thus grounding the memory card connector 10 providing protection against transient suppression interference.

Figure 9:
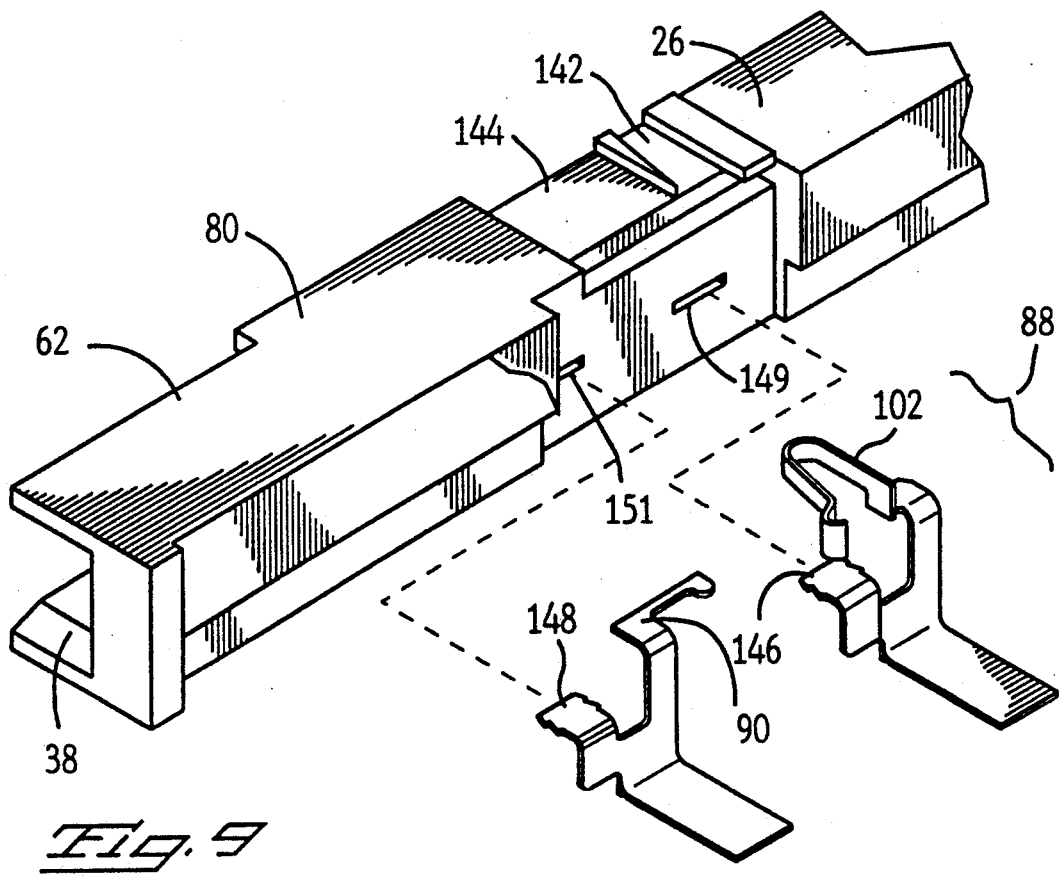
FIG. 9 is an exploded perspective view of a memory card track leg including an switch which connects/disconnects the electrical current between the memory card connector and the memory card.

FIG. 9 illustrates a partial perspective view of the forward terminal part of the memory card track leg 26, which includes a switch 88. On the outside surface 58 of the memory card track leg 26 is a groove which is disposed to receive the cover guide (not shown) of the cover (not shown). On the forward end of the memory card track leg 26 is a cover guide groove stop 62 which acts to prevent the cover (not shown) from moving any further in the forward direction, and the track mouth 38 which is designed to receive a memory card (not shown). The switch 88 includes a spring 102 and a spring stop 90 each of which are disposed to fit into respective slots on the track leg 26,80. The spring 102 fits into the rearward slot 142 and the spring tension member 140 fits into the frontward slot 144, each of the spring 102 and the spring tension member 140 having securing means, 146, 148 respectively, for securing the spring 102 and spring tension member 140 into the memory card track leg 26 at holes 149 and 151 respectively for the spring 102 and the spring stop 90 The slot 144 disposed to receive the spring tension member 140 is also disposed to receive a t-knob (not shown).

Figure 10:
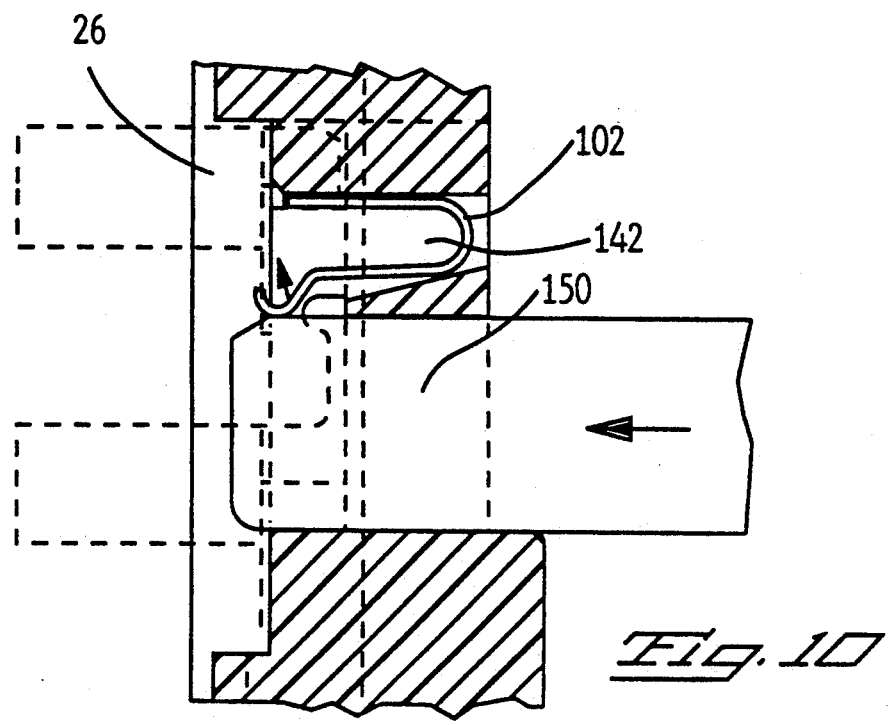
FIG. 10 is an enlarged cross section view of a memory card track leg and switch of FIG. 9 with the switch in the open position.
Figure 11:
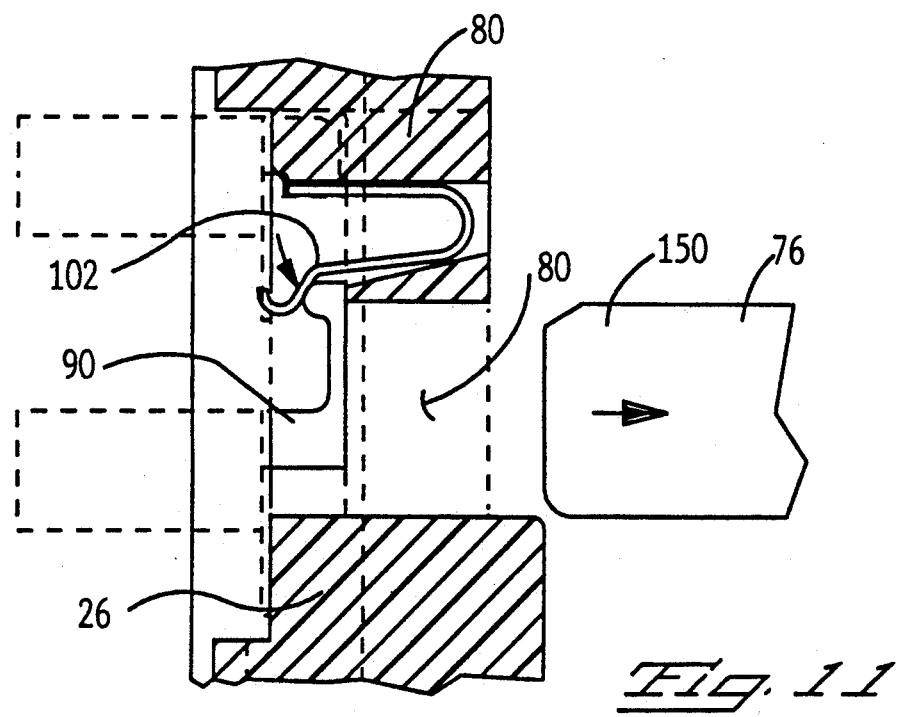
FIG. 11 is an enlarged cross section view of a memory card track leg and switch of FIG. 9 with the switch in the closed position.

FIGS. 10 and 11 illustrate the operation of the switch 88, with FIG. 10 illustrating a partial cross sectional view of a memory card track leg 26 which includes a switch 88. The switch 88 is depicted in the open position with the switch end 150 of the t-knob 76 inserted into the slot 144 and pressed against the spring 102.

FIG. 11 illustrates the switch 88 of FIG. 10 in the closed position, with the switch end 150 of the t-knob 76 removed. With the switch end 150 of the t-knob 76 removed, the spring 102 is biased against the tension member 140.

Figure 12:
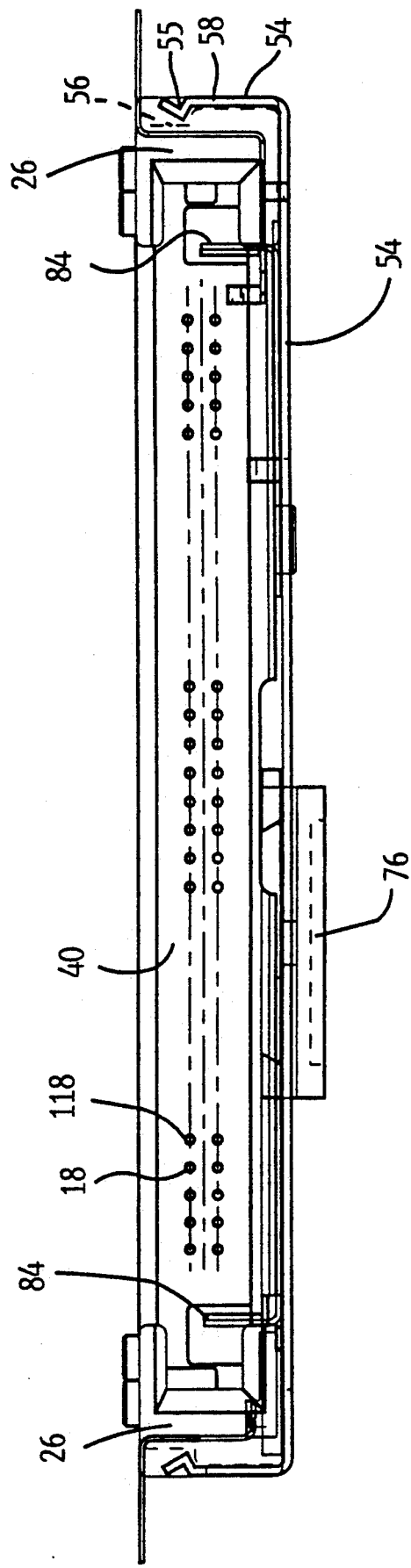
FIG. 12 is a front view of the memory card connector of FIG. 1.

FIG. 12 illustrates the front view of the memory card connector of FIG. 1, also shown in the upside down or bottom position or orientation. As shown in FIG. 12, the cover 54 has cover guides 55 which are disposed to fit into cover guide grooves 56 on the outside surface 58 of each memory card track leg 26. The t-knob 76 is positioned on the top of the cover 54. The ejector engaging elements 106 of the arm portions 84 of cam levers 68 are illustrated positioned in the forwardly extending slots 82. Extending from the front surface 40 of the connector housing 14 are post ends 118 of host pin connectors 18.

Figure 13:
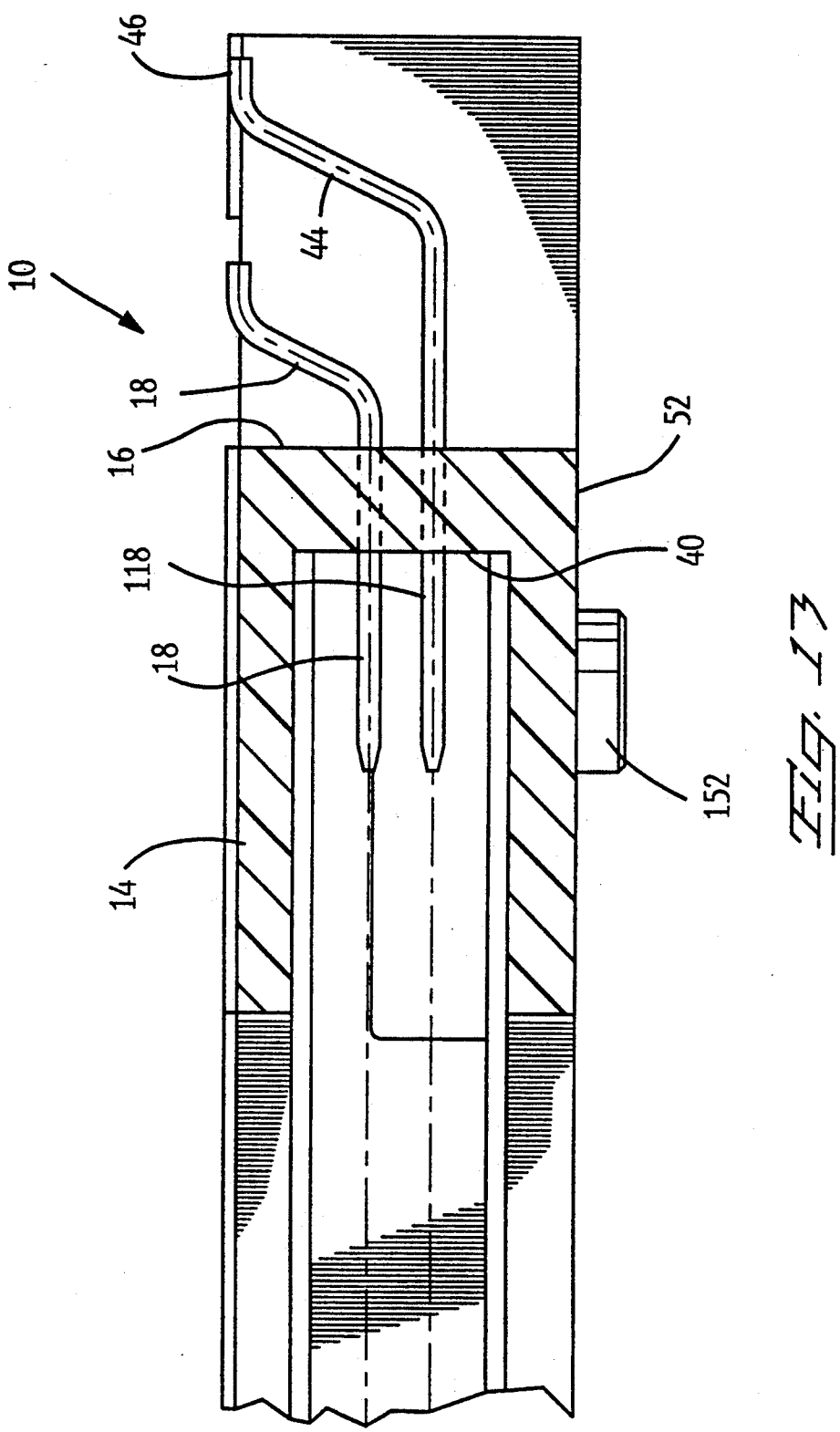
FIG. 13 is a partial cross sectional side view of the memory card connector of FIG. 1 taken along the z—z axis showing electrical contacts housed therein.

Turning to FIG. 13, a partial cross sectional view of the rearward end of the memory card connector 10 of FIG. 1 is shown, also in upside down position as in FIG. 12. Host pin connectors 18, which are depicted retained in the connector housing 14, comprise post ends 118, extending from the front surface 40 of the connector housing 14, intermediate ends (not shown) which are retained in passages in the connector housing (not shown), and tail ends 44 extending rearwardly and downwardly from the rear surface 16 of the connector housing 14 to a free end 46. Polarization key 152 is shown on the top surface 52 of the connector housing 14.

Variations on the embodiments described above are possible. For example, the cover 54 may actuate only one cam lever 68 instead of two cam levers 68, as illustrated in the above FIGURES. The single ejector element 106 may be placed along the one edge of memory card engaging surfaces 132, or near the center of the rear surface 126 of the memory card 42.

In another variation, the memory card ejector 12 includes the cam lever 68 multiplying the transmitted force to the cover 54 by a factor of about two when applied to the force imposed on (or the movement of) the ejector engaging element 106. As can be seen in FIGS. 5-6, the force multiplication factor (or force division factor) can be varied by utilizing ratios of distance between the pivot point 124 and the ejector engaging element 74 and distance between the pivot point 124 and the cam engaging element 74. In this way the desired level of force to eject the card from the connector can be achieved.

In another variation, the present invention envisions the use of the disclosed disengagement device in any apparatus in which an electrical connector device is to be connected, for example, in high density electrical connectors wherein a plurality of male electrical pin contacts are mated with a plurality of female terminal receptor contacts. In such a variation of the present invention, the cover 54 and actuated cam mechanism 65 having cam levers 68 and their respective arm portions 84 would be positioned to mate the memory card 42 into the host pin connectors 18. In this embodiment, the connection of the memory card 42 to the memory card connector 10 would occur in reverse order to that described above, which would be depicted by the respective order FIGS. 7-6-5. Placement of the cam levers 68 would position the ejector engaging elements 106 on the other end of the memory card 42, e.g., such as extending the cam levers 68 generally parallel the arcuate grooves 72 but extended to engage the other end of the memory card 42. This variation can also be used with another set of cam levers 68 which would be positioned to disengage the memory card 42 from the host pin connectors 18, In yet another variation, the actuating element 54 may be any device which is suitable for actuating a cam lever 68 as in the present invention. For example, a handle may be used or a lever or button device may also be suitable.

In yet still another variation, the cam mechanism 65 of the memory card ejector 12 includes the actuating element 54 defining the cam surface and the cam levers 68 including a cam engaging element 74. This variation would function similar above described FIGURES where the cam mechanism 65 defines the cam surface 72 on the cam levers 68 and the actuating element 54 defines the cam engaging element 74.

In still yet another variation, the memory card ejector includes the cam lever to define a substantially straight cam engaging surface disposed to impart a proportional displacement of ejector engaging element 106 of the arm portion 84 upon the memory card 42 with that covered by the initial movement of the cam engaging element 74 within the straight cam surface. For example, this could be accomplished by connecting point A of FIG. A with point C of FIG. 7. Further, the memory card ejector alternatively includes the cam lever 68 to define an arcuate cam surface disposed to impart a proportionally lesser displacement of the ejector engaging element 106 of the cam lever 68 upon the memory card 42 than that covered by the initial movement of the cam engaging element 74 within the arcuate cam surface. This can be accomplished by a mirror image of the arcuate groove 72 of FIG. 5.

The embodiments described above provide a number of significant advantages. As described in the description of the embodiments above, the present invention combines the advantage of ease of application of a substantial force to the ejector engaging element 106 of the arm portion 84 of the cam lever 68 and the corresponding ease of disengaging the memory card 42, and the advantage of achieving a maximum displacement of the arm portion 84 during the initial movement of the cover 54. This results in an ejector which is simple to operate, requires no specialized adaptations to the memory card, and achieves maximal disengaging force with a minimal effort.

Of course, it should be understood that a wide range of changes and modifications can be made to the preferred embodiment described above. It is therefore intended that the foregoing detailed description be understood that it is the following claims, including all equivalents, which are intended to define the scope of this invention.

I claim:

1. A memory card ejector for a memory card connector having a host pin connector adapted to receive a corresponding electrical connection terminal of a memory card, said memory card ejector comprising:
   an actuating element disposed for controlled movement on a guide element positioned on the memory card connector;
   a cam mechanism mounted on the memory card connector defining a cam surface displaceable by said actuating element disposed to actuate a cam lever having an ejector engaging element disposed to linearly and rotationally engage an engaging surface of said memory card; said actuating element including a cover, the displacement of which along memory track card legs connected to the memory card connector actuates said cam mechanism to engage said ejector engaging elements to eject said memory card from said host pin connector.

2. The memory card ejector according to claim 1, wherein said cam mechanism multiplies the transmitted force applied by the movement of said actuating element via said cam lever to said ejector engaging elements of said cam mechanism.

3. The memory card ejector according to claim 1, wherein said cam mechanism defines a cam surface disposed to impart maximum displacement of said ejector engaging elements of said arm portions of said cam lever during the initial movement of said actuating element.

4. The memory card ejector according to claim 1, further comprising a plurality of cam mechanisms each having cam levers whereby actuation of said actuating element causes a plurality of ejector engaging elements of said arm portions of said cam levers to eject said memory card.

5. The memory card ejector according to claim 1, further comprising spring means, said spring means applying a biasing force against said cam mechanism in a direction opposite that in which said cam lever is displaced to eject said memory card thereby causing said cam mechanism to be returned to a memory card receiving position.

6. The memory card ejector according to claim 1, wherein said cam mechanism defines said cam surface on said cam levers and said actuating element defines a cam engaging element.

7. The memory card ejector according to claim 1, wherein said actuating element defines said cam surface and said cam lever includes a cam engaging element.

8. The memory card ejector according to claim 1, further comprising a plurality of host pin connectors and a corresponding plurality of electrical connector terminals in said memory card.

9. A memory card ejector for a memory card connector having a host pin connector adapted to receive a corresponding electrical connection terminal of a memory card, said ejector comprising:
   a cover disposed to receive an input force for controlled movement along memory card tracks affixed to said memory card connector, said cover having a cam engaging element;
   a cam lever pivotally mounted to the memory card connector including a cam surface to receive said cam engaging element and an ejector engaging element disposed to linearly and rotationally engage a memory card engaging surface of said memory card;
   whereby movement of said cover actuates said cam lever to cause said ejector engaging element of said cam lever to linearly and rotationally engage said memory card engaging surface in a manner to disengage said memory card from said host pin connector, said cam lever defining an actuate cam surface disposed to impart a proportionally greater displacement of said ejector engaging element of said arm portion upon said memory card than that covered by the initial movement of said cam engaging element within said arcuate cam surface.

10. The memory card ejector according to claim 9 wherein said cover moves substantially parallel to said host pin connector, the displacement of which along memory card track legs affixed to said memory card connector actuates said cam lever to engage said ejector engaging element to displace said memory card, said cam lever being pivotally mounted on a pivot point affixed on said connector housing of said memory card connector.

11. The memory card ejector according to claim 9, wherein said cam lever multiplies transmitted force to said cover by a factor of about two when applied to the movement of said ejector engaging element.

12. The memory card ejector according to claim 9, wherein said ejector engaging element of said cam lever is mounted upon a cam lever pivot point and defines an arrangement to impart maximum linear distance upon said memory card relative to linear movement of said cover.

13. A memory card ejector for a memory card connector having a host pin connector adapted to receive a corresponding electrical connection terminal of a memory card, said ejector comprising:
   a cover disposed to receive an input force for controlled movement along memory card tracks affixed to said memory card connector, said cover having a cam engaging element;
   a cam lever pivotally mounted to the memory card connector including a cam surface to receive said cam engaging element and an ejector engaging element disposed to linearly and rotationally engage a memory card engaging surface of said memory card;
   whereby movement of said cover actuates said cam lever to cause said ejector engaging element of said cam lever to linearly and rotationally engage said memory card engaging surface in a manner to disengage said memory card from said host pin connector, said cam lever defining an arcuate cam engaging surface disposed to impart a proportionally lesser displacement of said ejector engaging element of said arm portion upon said memory card engaging surface than that covered by the initial movement of said cam engaging element within said arcuate cam surface.

14. The electrical connector according to claim 13, wherein said electrical connector further includes a plurality of host male pins and female electrical connection terminals each disposed in parallel rows.

15. A memory card ejector for a memory card connector having a host pin connector adapted to receive a corresponding electrical connection terminal of a memory card, said ejector comprising:
   a cover disposed to receive an input force for controlled movement along memory card tracks affixed to said memory card connector, said cover having a cam engaging element;
   a cam lever pivotally mounted to the memory card connector including a cam surface to receive said cam engaging element and an ejector engaging element disposed to linearly and rotationally engage a memory card engaging surface of said memory card;
   whereby movement of said cover actuates said cam lever to cause said ejector engaging element of said cam lever to linearly and rotationally engage said memory card engaging surface in a manner to disengage said memory card from said host pin connector, at least two opposed cam levers each receiving cam engaging elements and having ejector engaging elements disposed to engage said memory card engaging surface of said memory card whereby said two ejector engaging element of said cam levers are disposed to eject said memory card from said host pin connector.

16. The memory card ejector according to claim 15, further comprising spring means affixed to each of said cam levers, said spring means applying a biasing force against said cam levers in a direction opposite that in which said cam levers are displaced to eject said memory card thereby causing said cam mechanism to be returned to a memory card receiving position.

17. A memory card ejector for a memory card connector having a host pin connector adapted to receive a corresponding electrical connection terminal of a memory card, said ejector comprising:

a cover disposed to receive an input force for controlled movement along memory card tracks affixed to said memory card connector, said cover having a cam engaging element;

a cam lever pivotally mounted to the memory card connector including a cam surface to receive said cam engaging element and an ejector engaging element disposed to linearly and rotationally engage a memory card engaging surface of said memory card;

whereby movement of said cover actuates said cam lever to cause said ejector engaging element of said cam lever to linearly and rotationally engage said memory card engaging surface in a manner to disengage said memory card from said host pin connector, said cover including a switch disposed to assure electrical disconnection of said host connector pin from said electrical connection terminal disposed in said memory card prior to movement of said cover to eject said memory card.

* * * * *

UNITED STATES PATENT AND TRADEMARK OFFICE
CERTIFICATE OF CORRECTION

PATENT NO. : 5,275,573

DATED : January 4, 1994

INVENTOR(S) : Earl W. McCleerey

It is certified that error appears in the above-identified patent and that said Letters Patent is hereby corrected as shown below:

In the Claims:

Column 13, line 60
Claim 9, Line 20 - "actuate" should be --arcuate--

Column 15, line 2, claim 15
"element" should be --elements--

Signed and Sealed this

Sixteenth Day of May, 1995

Attest:

BRUCE LEHMAN

Attesting Officer     Commissioner of Patents and Trademarks